United States Patent [19]
Pitzer et al.

[11] Patent Number: 5,238,289
[45] Date of Patent: Aug. 24, 1993

[54] DOOR GUARD BEAM FOR MOTOR VEHICLES

[76] Inventors: Gene Pitzer, 16745 Camellia Ct., Fraser, Mich. 48026; Gerald M. Scensny, 290 Moran, Grosse Pointe Farms, Mich. 48236

[21] Appl. No.: 784,166

[22] Filed: Oct. 28, 1991

[51] Int. Cl.$^5$ .............................. B60R 21/02
[52] U.S. Cl. ...................... 296/146.6; 296/188; 188/371
[58] Field of Search ............ 296/188, 146; 52/618, 52/732; 188/268, 371

[56] References Cited

U.S. PATENT DOCUMENTS

| | | | |
|---|---|---|---|
| 3,868,141 | 2/1975 | Johnson | 188/268 |
| 4,684,166 | 8/1987 | Kanodia | 296/188 |
| 4,708,390 | 11/1987 | Palentyn et al. | 296/188 |
| 4,861,097 | 8/1989 | Wycech | 296/188 |

FOREIGN PATENT DOCUMENTS

| | | | |
|---|---|---|---|
| 3500551 | 6/1986 | Fed. Rep. of Germany | 296/188 |
| 50813 | 5/1981 | Japan | 296/188 |
| 240322 | 9/1989 | Japan | 296/188 |

Primary Examiner—Robert R. Song
Attorney, Agent, or Firm—John R. Benefiel

[57] ABSTRACT

A protective door guard beam for motor vehicles is disclosed, comprised of interfit beam segments, each welded to a respective door lock or hinge flange. The beam segments allow limited telescoping of the beam segments to avoid gross deformation of the door flanges during impact to prevent disengagement of the door lock. An interlock comes into engagement as the beam is deformed sufficiently to approach the inside of the door.

6 Claims, 2 Drawing Sheets

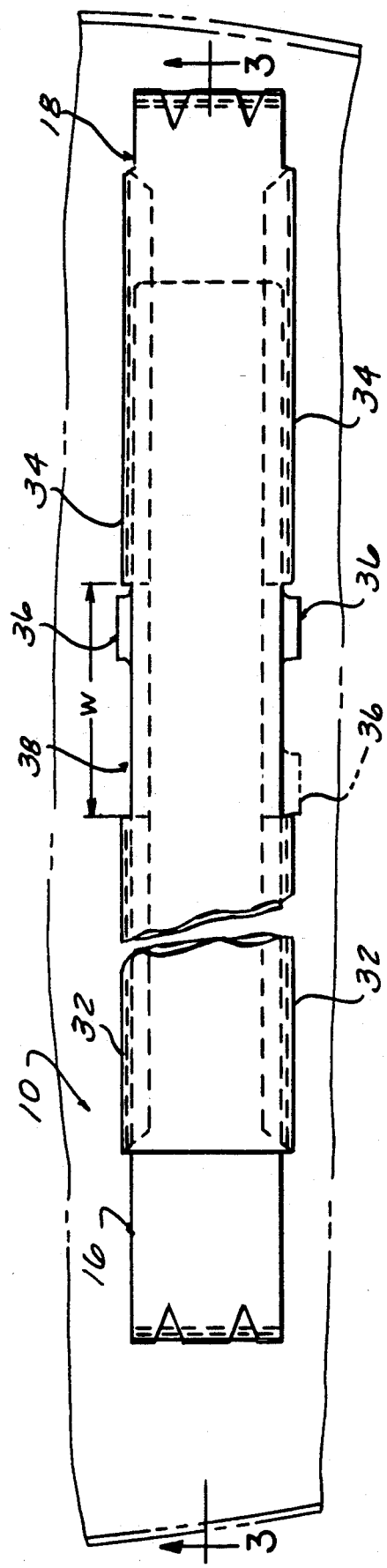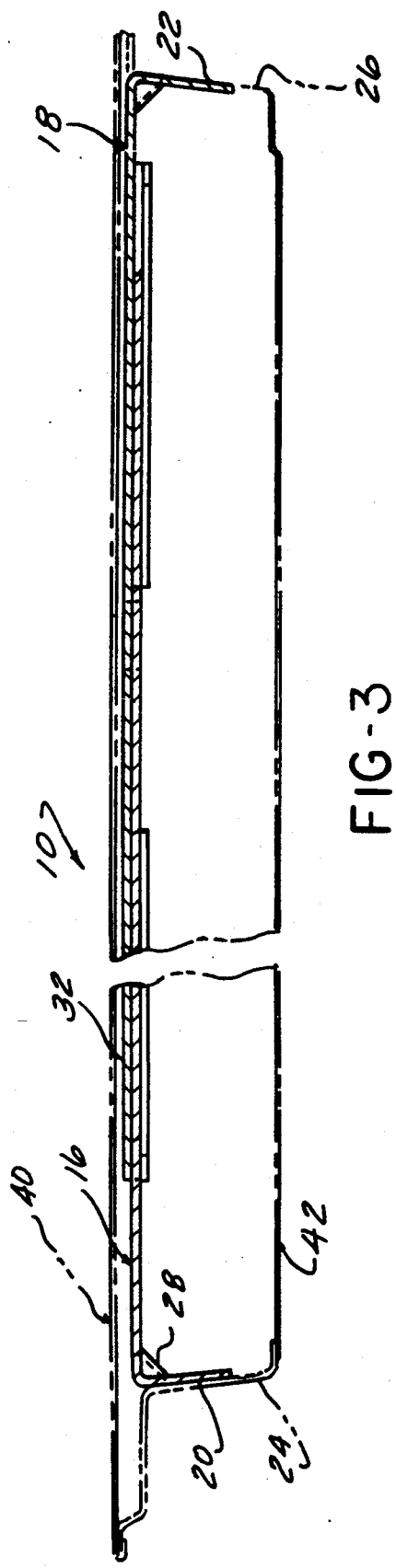

DOOR GUARD BEAM FOR MOTOR VEHICLES

BACKGROUND OF THE INVENTION

This invention concerns impact protecting guard beams for doors of motor vehicles, which have come into widespread application. Such beams are positioned horizontally within the door at approximately the mid-level of the door and are intended to protect the passenger compartment from penetration in the event of a side impact collision.

These beams are thus of sturdy construction to resist bending. These beams are securely attached at either end to the hinge and lock hem flanges of the door, as by welding of tabs formed on the beam ends to the door hem flanges.

While guard beams have been quite successful in improving vehicle safety, the deformation of the beam during a collision has been found to have a tendency to twist the lock mounting door edge to such an extent that the door lock mating components become disengaged, allowing the doors to immediately pop open in a collision. This tendency itself creates a safety hazard and must be avoided by a lengthy process of experimentally determining the configuring of the beam and door details which will avoid this tendency. This need for a substantial design effort to avoid this problem adds a great burden to the development of each new vehicle design.

The object of the present invention is to provide a protective beam for motor vehicle side doors which minimizes the tendency for twisting of the door lock mounting edge structure particularly in the early stages of a collision.

SUMMARY OF THE INVENTION

The present invention comprises a protective beam comprised of two interfit segments, one segment welded at one end to the door lock hem flange and the other welded at one end to the hinge door hem flange. The other ends of the segments are free to allow limited telescoping extension of the beam as the beam is deformed during the initial stages of an impact, largely eliminating any tendency to twist the door edge structure.

As the center of the beam deforms to approach the inside door panel, an interlock arrangement between the free ends of the beam segments comes into abutment to prevent further extension, and together with the inner door panel, acts to resist penetration of the passenger compartment by the impacting structure.

The telescoping relationship avoids gross deformation of the door hem flanges so that the door lock continues to be operative. At the same time the interlocked segments of the door beam resist penetration of the passenger compartment.

DESCRIPTION OF THE DRAWINGS

FIG. 2 is an enlarged side view of the safety door beam shown in FIG. 1, with a fragmentary view of adjacent portions of the door shown in phantom.

FIG. 3 is a longitudinal sectional view of the door beam shown in FIG. 2 with the door structure shown in phantom.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
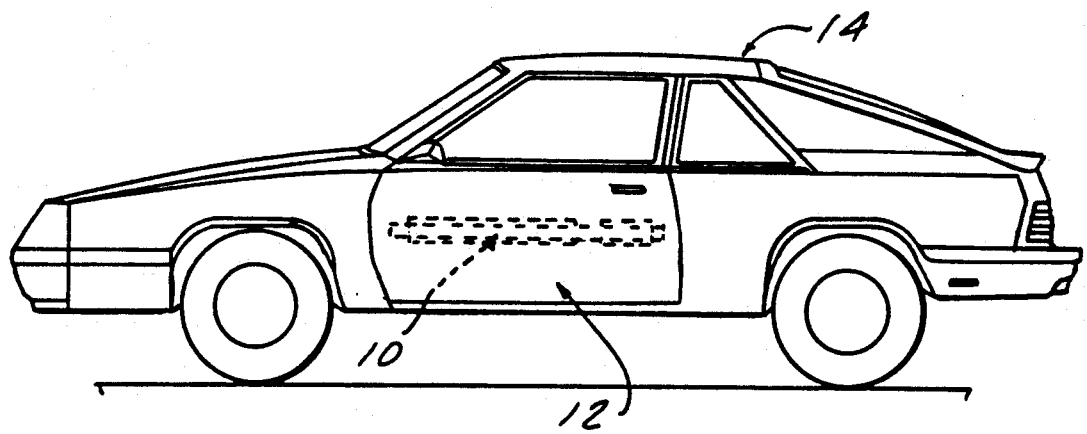
FIG. 1 is a side view of a motor vehicle showing a safety door beam according to the present invention installed in that vehicle side door.
Figure 4:
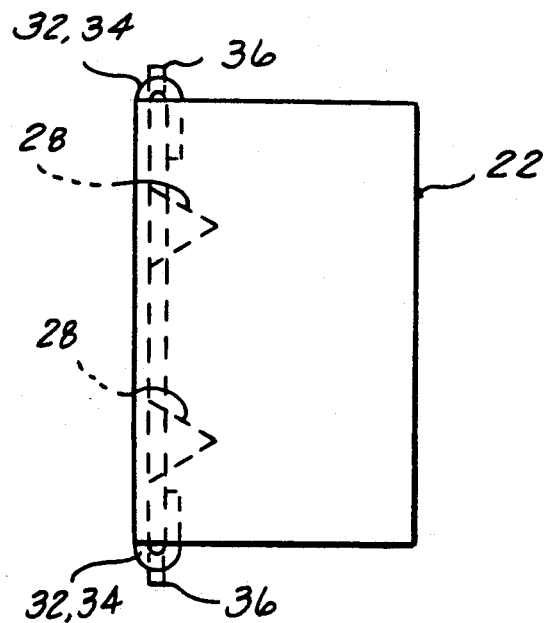
FIG. 4 is an end view of the door beam shown in FIGS. 2 and 3.

FIG. 1 illustrates a door guard beam 10 installed in the left side door 12 of a motor vehicle, shown here as a passenger car 14. The door guard beam is installed to extend side to side at mid height of the door 10 as per conventional practice.

As shown in FIGS. 2 and 3, the door beam 10 is constituted by interfit left and right segments 16, 18. Each segment is formed with a respective inturned flange 20, 22 welded to the lock and hinge hem flanges 24, 26 of the door 12. Reinforcing gussets 28, 30 may be provided.

The left beam segment 16 slides within channels formed by inwardly folded edges forming fore and aft spaced guides 32, 34 on either side of the right beam segment 18.

The left beam segment 16 is formed with a pair of projecting ears 36 each located in a gap 38 between the spaced guides 32, 34.

Thus, means are provided for allowing a limited extent of telescoping travel between the left and right segments 16, 18, which subsequently come into an interlocked condition as the ears 36 engage the left guides 32.

In a crash event, the left and right beam segments 16, 18 are designed to allow relative movement as the outside door panel 40 collapses, avoiding gross deformation of the door hem flanges 24, 26, until the beam 10 approaches, the inner door panel 42. The width W of the gap 38 is selected so that the ears 36 come into abutment with guides 32, establishing an interlocked condition of the left and right segments 16, 18 at the point where the safety beam 10 approaches the inner door panel 42.

The outer door panel 40, door beam 10, and inner door panel 42, when collapsed together, offer very substantial resistance to further deformation, thus protecting the vehicle passenger compartment from penetration.

The avoidance of gross deformation of the door flanges in turn avoids disengagement of the mating door lock components so as to keep the door closed, an important result in crash performance of a vehicle.

Figure 5:
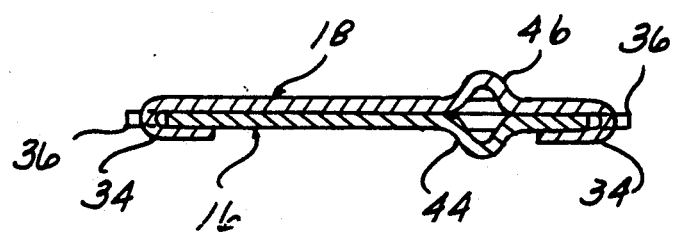
FIG. 5 is a transverse sectional view through a door beam according to the present invention, showing the addition of longitudinal stiffener ribs in each segment.

As shown in FIG. 5, each of the left and right beam segments 16, 18, can be formed with longitudinal stiffener ribs 44, 46 as necessary.

I claim:

1. In combination with a motor vehicle passenger compartment door, said door including a lock mounting flange and an opposite hinge flange, a door guard beam, said door guard beam extending across the width of said door, and comprising left and right door guard beam segments telescopically interfit together, one of said left and right door guard beam segments attached to one of said lock mounting and hinge flanges and the other of said left and right door guard beam segments attached to the other of said lock mounting and hinge flanges, whereby said left and right door guard beam segments are able to relatively move during deformation to reduce twisting deformation of said door lock and hinge flanges.

2. The combination according to claim 1 wherein said door beam further includes interlock means acting between said interfit left and right beam segments to produce a positive interlock after a predetermined extent of telescoping movement between said left and right segments.

3. The combination according to claim 2 wherein one of said beam segments has folded edges forming guides receiving the sides of the other of said segments, and wherein said interlock means comprises an ear formed on either side of the other of said segments extending into a gap formed in said guides on said one segment.

4. The combination according to claim 3 wherein each of said segments are substantially flat elongated pieces, each formed with at least one longitudinal stiffener rib.

5. The combination according to claim 4 wherein the outboard end of each segment is formed with a flange welded to a respective one of said door lock and hinge flange.

6. The combination according to claim 2 wherein said interlock means operative when said door beam is deformed sufficiently to approach the inside panel of said door.

* * * * *